D. HAGUE.
Gate.

No. 62,412.  Patented Feb. 26, 1867.

Witnesses:
S. S. Fahnestock
W. N. Walton

Inventor:
David Hague.

United States Patent Office.

DAVID HAGUE, OF BALVILLE TOWNSHIP, OHIO.

Letters Patent No. 62,412, dated February 26, 1867.

IMPROVEMENTS IN GATES.

*The Schedule referred to in these Letters Patent and making part of the same.*

TO ALL WHOM IT MAY CONCERN:

Be it known that I, DAVID HAGUE, of Balville township, county of Sandusky, in the State of Ohio, have invented a new and useful Improvement in Gates; and I do hereby declare that the following is a full and exact description thereof, reference being had to the accompanying drawings, making part of this specification, and in which like parts are indicated by like letters in the several figures.

The nature of my invention consists in so constructing a gate that, whilst it can be slid backwards and forwards, as also rotated at or near its centre, it is also capable of being raised above the ground at pleasure and on its several positions.

To enable those skilled in the art to make and use my invention, I will proceed to describe its construction and operation.

A represents a post, having openings for the ends of the gate bars $a$. C C are the upright posts of the gate, to which said bars are secured. D is a post, where the gate stops about midway, and rotates into a position at right angles, sliding on a centre rest, $b$, and on a pin, $c$, which latter projects into a slot in the bottom rail. $b$ and $c$ are secured to sill-piece B. $d$ is another post, secured, like D, in the ground, or to sill-piece B. Between these two posts the gate slides. The tops of these posts are connected by a cap-piece, $e$, down from which projects a pin, $f$, which extends into a groove in the rail next to the top or a cap-piece, $g$, secured thereon. This cap-piece has two openings through it for pin $f$ to pass through in its raised position when shut or when open. Near the centre of the gate, between two vertical slats or guide pieces, $h$, I have secured a movable sliding piece, $i$, attached to which is a lever cam, $j$; over the cam part is a cleat, $k$, secured to one of the vertical pieces $h$. When the gate is shut, or when sliding back, the bottom bar $a$ rests on support $b$, as also on the top cap $e$. When the gate is open and turned, it rests entirely on cap-piece $e$. $l$ is an ordinary pivoted latch to keep the gate from being slid back when shut, unless it be purposely raised by an individual so as to open the gate. $m$ is a drop bolt, to keep the gate in an open or turned position when so desired to be, and $n$ is a hook, secured to post D, to be used for a similar purpose, but hooking into the top of cap $g$.

Figure 1:
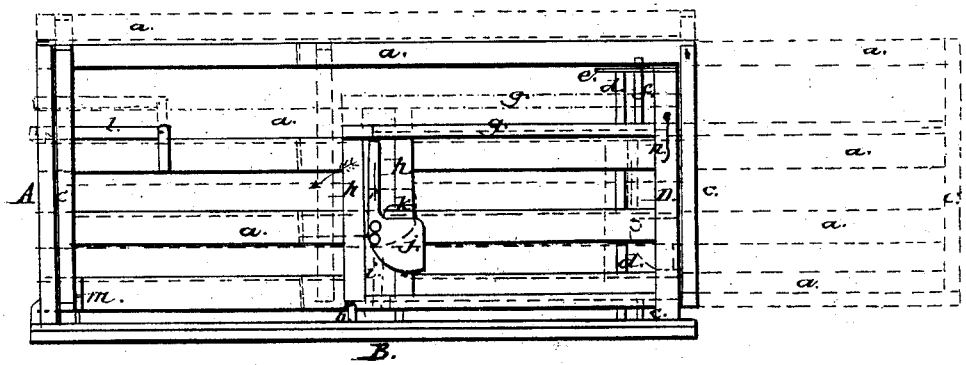
Figure 1 represents an elevation of my gate in its shut and lowest position, whilst the red lines of same figure show the gate in its slid-back or half-open position, and the blue lines of same figure show the gate shut but raised.
Figure 2:
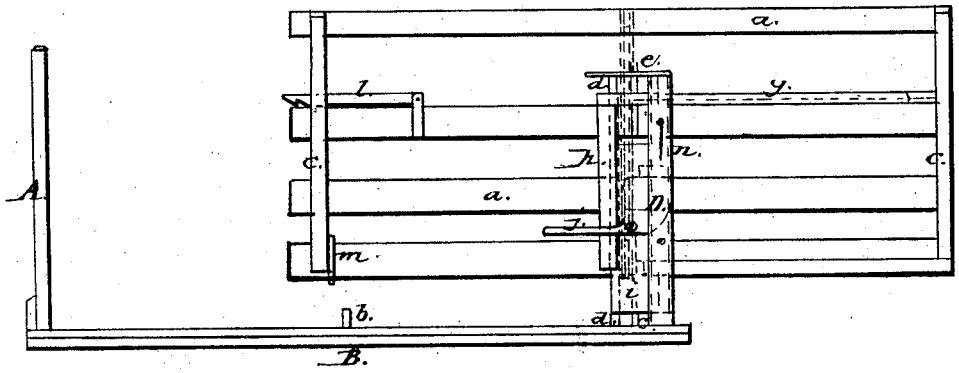
Figure 2 represents the gate half open and raised, and the red lines show it turned at right angles to said position.

The operation is as follows: Firstly, the gate being shut, as shown in fig. 1, to raise it, turn down the arm of lever in the direction of red arrow, and shown turned down fully in fig. 2. This places it in the position shown in blue lines; but before turning down the cam lever, it is necessary to raise the latch $l$, slide back the gate a few inches, so as to clear the second upper rail from the catch of the latch, raise the gate slightly, and rest this second rail, which was below the catch, on top of it, pushing the gate a little forward; then, by turning down the lever cam, the gate assumes a raised position, as shown by blue lines, fig. 1, before mentioned. Simply to half open the gate, raise the latch as before, and push the gate half way back, as seen in red lines, fig. 1. In this position it can be raised, as shown in fig. 2, in the same way as before described. It can be rotated into a position at right angles before or after it is raised. The lever of the cam may have a spring catch attached to it, or any other suitable stop can be used to hold it in any desirable position, thereby regulating the height of the gate at pleasure. Thus it will be seen my gate can slide, rotate, and be raised in several different positions.

Having thus described my invention, what I claim as new, and desire to secure by Letters Patent of the United States, is—

1. A sliding, rotating, and raising gate, constructed and operated in the manner substantially as shown and described, and for the purpose set forth.

2. The combination of lever cam $j$, sliding bar $i$, guide pieces or slats $h$ $h$, and the gate or its bars $a$ $a$, constructed, arranged, and operating in the manner substantially as shown and described, and for the purpose set forth.

DAVID HAGUE.

Witnesses:
S. S. FAHNESTOCK,
JOHN S. HOLLINGSHEAD.